(12) United States Patent
Song et al.

(10) Patent No.: US 7,544,219 B2
(45) Date of Patent: Jun. 9, 2009

(54) GASKETED MEMBRANE-ELECTRODE-ASSEMBLY AND FUEL CELL SYSTEM EMPLOYING THE SAME

(75) Inventors: Seong-Min Song, Seoul (KR); Go-Young Moon, Daejeon (KR); Won-Ho Lee, Daejeon (KR); Ha-Chull Chung, Cheonan (KR); Kyoung-Il Park, Seoul (KR); Hwang-Chan Yoo, Daejeon (KR); Sang-Hyun Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 416 days.

(21) Appl. No.: 11/328,458

(22) Filed: Jan. 10, 2006

(65) Prior Publication Data

US 2006/0159978 A1    Jul. 20, 2006

(30) Foreign Application Priority Data

| Jan. 12, 2005 | (KR) | ...................... 10-2005-0002863 |
| Jan. 10, 2006 | (KR) | ...................... 10-2006-0002650 |

(51) Int. Cl.
*H01M 4/82* (2006.01)
*H01M 2/08* (2006.01)

(52) U.S. Cl. ........................ 29/623.2; 429/36
(58) Field of Classification Search .................. 429/35, 429/36, 30; 29/623.2
See application file for complete search history.

(56) References Cited

U.S. PATENT DOCUMENTS

| 6,316,139 B1 | 11/2001 | Uchida et al. |
| 6,716,550 B1 | 4/2004 | Kirby |
| 2003/0091885 A1 | 5/2003 | Kobayashi et al. |

FOREIGN PATENT DOCUMENTS

| EP | 1174482 A1 | 1/2002 |
| EP | 1367301 A1 | 12/2003 |
| EP | 1458040 A2 | 9/2004 |
| JP | 09-097619 | 4/1997 |
| JP | 09097619 | 4/1997 |
| JP | 2002-329512 | 11/2002 |

*Primary Examiner*—Patrick Ryan
*Assistant Examiner*—Thomas H. Parsons
(74) *Attorney, Agent, or Firm*—McKenna Long & Aldridge LLP

(57) ABSTRACT

The present invention relates to a gasketed membrane-electrode assembly comprising gaskets arranged on each side of a membrane-electrode assembly including a cathode, an anode, and a polymer electrolyte membrane, in which the gaskets are multilayered films comprising an elastic layer and an adhesive layer formed on each side of a support layer. According to the present invention, the gasket film can be united with the polymer electrolyte membrane, and the leakage of fuel gas and oxidizing gas decreases on operation of a fuel cell. In addition, various materials can be selected for each layer of the gasket. Thus, it can be suitable for mass production of a polymer fuel cell due to its simple manufacturing process.

9 Claims, 6 Drawing Sheets

US 7,544,219 B2

GASKETED MEMBRANE-ELECTRODE-ASSEMBLY AND FUEL CELL SYSTEM EMPLOYING THE SAME

BACKGROUND OF THE INVENTION

This application claims the benefit of Korean Patent Application Nos. 10-2005-0002863 and 10-2006-0002650 filed Jan. 12, 2005 and Jan. 10, 2006, respectively, in Korea, which are hereby incorporated by reference in their entirety.

(a) Field of the Invention

The present invention relates to a gasketed membrane-electrode assembly, and a fuel cell system comprising the same. Because the gasket and membrane-electrode assembly is provided as a single body, leakage of gases such as fuel gas and oxidizing gas decrease when operating the fuel cell. Various materials can be selected for preparing each layer, and a process of manufacturing a fuel cell therewith is simple, and thus the gasketed membrane-electrode assembly is suitable for mass production of fuel cells.

(b) Description of the Related Art

Fuel cells have recently become more important as a new power generation system. In the near future, fuel cells may replace the currently-used electric power sources for automobiles, for residential power generators, and for portable products.

A polymer electrolyte fuel cell is a direct current power generator that transforms chemical energy of a fuel into electrical energy through an electrochemical reaction. The fuel cell is a continuous complex comprising a membrane-electrode assembly (MEA) as a heart of the fuel cell, and a separator (or bipolar plate) that collects the electricity and provides the fuel. The membrane-electrode assembly is a joint body of a polymer membrane where hydrogen ions are transferred, and an electrode where a methanol solution or a fuel such as hydrogen reacts with air through an electrochemical catalytic reaction.

The electrochemical reaction consists of two separate reactions, which are an electrochemical oxidation reaction at a fuel electrode and an electrochemical reduction reaction at an air electrode. The fuel electrode and air electrode are separated by an electrolyte. In a direct methanol fuel cell, the fuel electrode is supplied with methanol and water instead of hydrogen, hydrogen ions generated in the process of methanol oxidation move to the air electrode along the polymer electrolyte, and then the reduction reaction with oxygen supplied from the air electrode occurs to produce electricity.

If a fuel or oxidizing agent supplied from each electrode passes through the electrolyte membrane, it has a negative effect on the performance of the fuel cell. Accordingly, it is necessary to prevent fuel and oxidizing gas from passing through the electrolyte membrane and mixing. The ability of prevention of mixing of the fuel and oxidizing gas is related to the properties of the polymer electrolyte membrane. In this regard, a gasket is arranged on the circumferential part of the membrane-electrode assembly that is outside of the electrode area, thereby preventing the fuel or oxidizing gas from passing through the membrane and mixing. However, because the electrolyte membrane is very expensive, the circumferential part of the electrolyte membrane in the membrane-electrode assembly is replaced with a new gasket to reduce the price of the fuel cell.

In addition, it is usual for the conventional assembly of the electrolyte membrane and the gasket to be manufactured by a molding method. The molding method is not suitable for continuous mass production, and the gasket that directly contacts the electrolyte membrane must be made from only halogenated resin having resistance to acid due to the acidity of the electrolyte membrane.

U.S. Pat. No. 6,316,139 discloses a united membrane-electrode assembly interposed between a pair of gaskets each consisting of an elastomer layer and an adhesive layer.

JP H09-097619 discloses a united membrane-electrode assembly interposed between a pair of gaskets which includes an elastic layer formed on an acrylic substrate, and the acrylic substrate is adhered to one side of the separator through an adhesive layer.

JP 2002-329512 discloses a gasket for a fuel cell where the gasket body is made from elastic material units with a stacked film of a resin film, an adhesive agent, and a releasing film. By peeling off the releasing film, the gasket is arranged on the polymer electrolyte membrane with an adhesive agent. However, in the method, only a part of the releasing film is removed, thereby decreasing adhesiveness between the polymer electrolyte membrane and gasket.

SUMMARY OF THE INVENTION

To resolve the problems in the prior art, when the present inventors carried out research on a new gasket material that can substitute for the electrolyte membrane used as the circumferential part of the membrane-electrode assembly, they found that a gasketed membrane-electrode assembly can be obtained by adhering the circumferential part of the membrane-electrode assembly to the gasket with the adhesive agent.

It is an object of present invention to provide a new gasket material for replacing the expensive electrolyte membrane, and thus to reduce the price of a fuel cell. It is another object of the present invention to provide a gasketed membrane-electrode assembly that is easily handled when assembling a fuel cell or a fuel cell stack.

DETAILED DESCRIPTION OF THE PREFERRED EMBODIMENTS

The present invention relates to a gasketed membrane-electrode assembly comprising gaskets arranged on each side of a membrane-electrode assembly comprising a cathode, an anode, and a polymer electrolyte membrane, in which the gaskets are multilayered films comprising an elastic layer and an adhesive layer formed on each side of a support layer.

In the gasketed membrane-electrode assembly, the gasket and the membrane-electrode assembly are united by affixing the prescribed region of polymer electrolyte membrane through the curing of an adhesive layer in a multilayered gasket.

In addition, the present invention relates to a fuel cell system comprising a gasketed membrane-electrode assembly interposed between a pair of separators.

Further, the present invention relates to a fuel cell system comprising a fuel cell stack formed by a plurality of unit cells of a fuel cell, and a gas supplying part for injecting a fuel gas and an oxidizing gas.

The present invention will now be explained in detail.

According to the present invention, a gasket film can be united with a polymer electrolyte membrane, and leakage of fuel gas and oxidizing gas decreases on operation of the fuel cell. In addition, various materials can be selected for each layer of the gasket. Thus, it can be suitable for mass production of a polymer fuel cell due to a simple manufacturing process.

Figure 1:
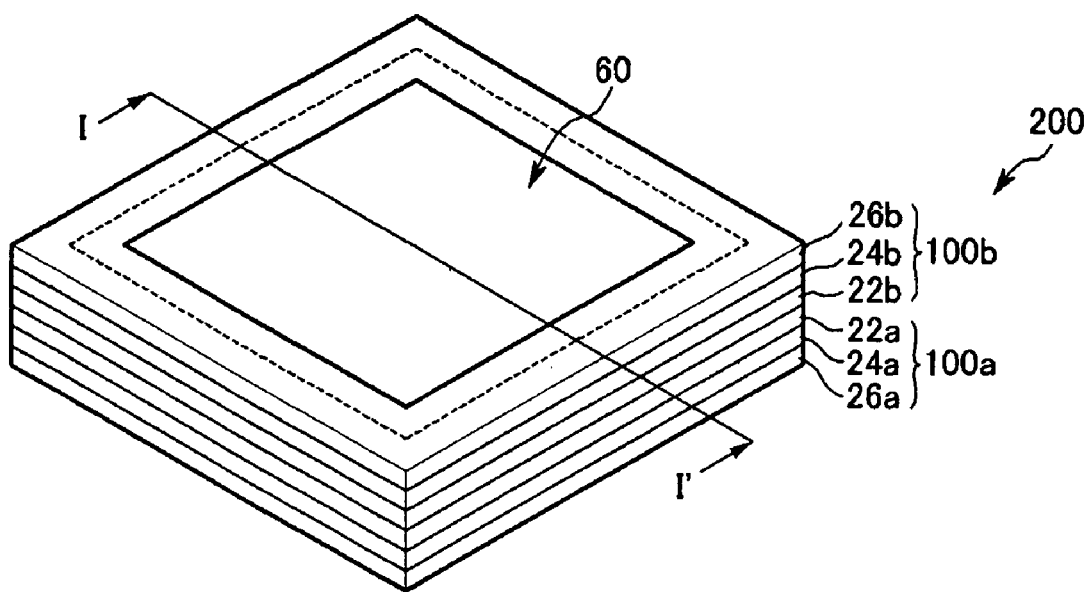
FIG. 1 is a front view showing a gasketed membrane-electrode assembly according to one embodiment of the invention.
Figure 2:
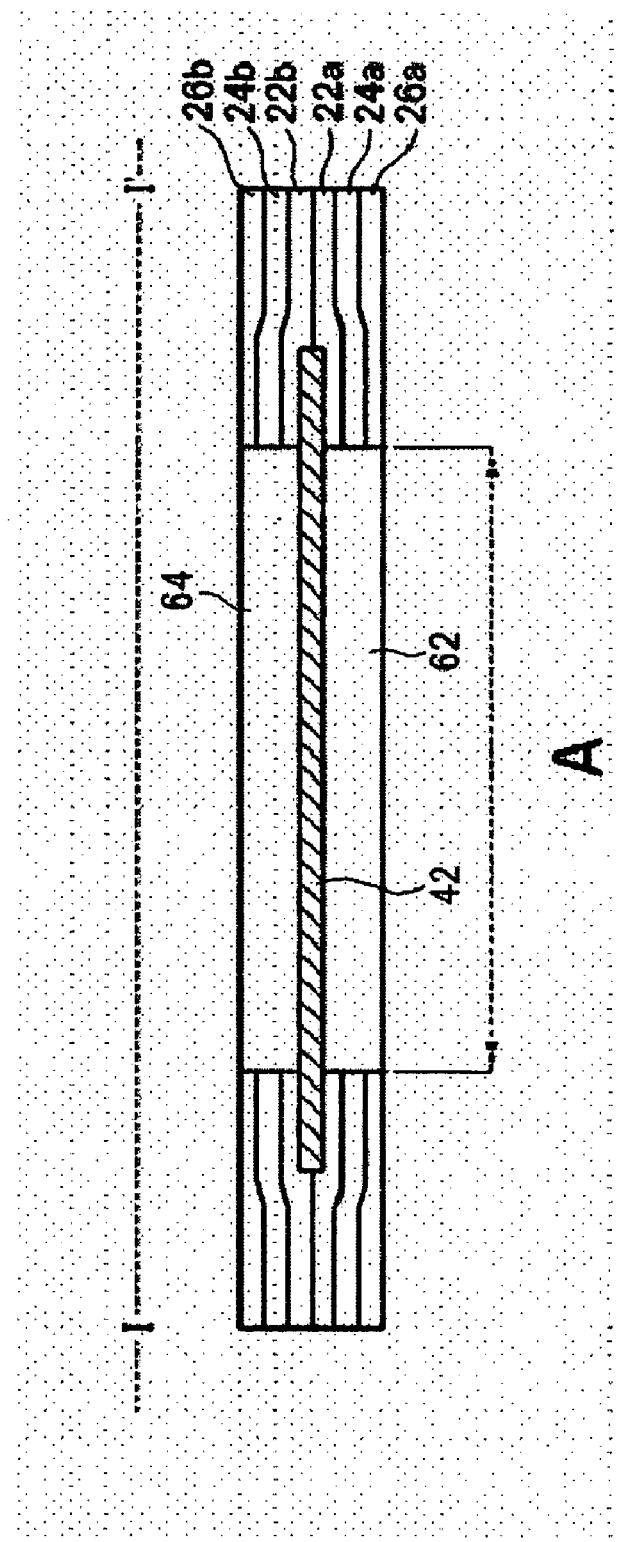
FIG. 2 is a cross-sectional view showing a section cut along line I-I' of FIG. 1.

FIG. 1 is a front view showing a gasketed membrane-electrode assembly 200 according to the invention, and FIG. 2 is a cross-sectional view showing a section cut along line I-I' of FIG. 1.

Referring to FIG. 1 and FIG. 2, the gasketed membrane-electrode assembly 200 has a structure where the electrodes 60 (62+64) are placed between a pair of multilayer gaskets 100a, 100b having an opening. The polymer electrolyte membrane 42 of the membrane-electrode assembly is interposed between adhesive layers 22a and 22b of a gasket. The gasket is a multilayered film formed by sequentially stacking a support layer 24a, 24b and an elastic layer 26a, 26b on the adhesive layer 22a, 22b.

The adhesive layer 22a, 22b is used for adhering the multilayered gasket to the membrane-electrode assembly. To obtain sufficient sealing, a material having resistance to water, heat, and acid can be used for the adhesive layer.

Preferably, the material of the adhesive layer 22a, 22b can be any adhesive agent having resistance to heat that is generated on operation of the fuel cell, and more preferably a resistance to heat of 150 to 200° C.

Examples of the adhesive agent include silicone resin, epoxy resin, acrylic resin, and a two-component resin of polyester-polyurethane. To obtain sufficient adherence and sealing, the thickness of the adhesive layer 22a, 22b is 10 to 200 μm, and more preferably 50 to 100 μm.

The support layer 24a, 24b prevents the elastic layer 26a, 26b from directly contacting the polymer electrolyte membrane. The polymer electrolyte membrane includes an organic or polymer electrolyte to transfer hydrogen ions, and thus is acidic. Therefore, if the polymer electrolyte membrane contacts the elastic layer 26a, 26b for a long time, it begins to corrode it. The support layer 24a, 24b separates the polymer electrolyte membrane and the elastic layer for preventing the corrosion of the elastic layer. In addition, the support layer 24a, 24b forms the shape of a gasket, and has resistance to stress which is caused by adhesion of the polymer electrolyte membrane to the membrane-electrode assembly.

Any material that can easily form a film and has dimensional stability and durability can be used for the support layer 24a, 24b. As examples, polyesters such as polyethyleneterephthalate and polybutyleneterephthalate, polyamides, polystyrenes, and polyolefins such as polyethylene, polypropylene, and a copolymer thereof can be used. To improve the interfacial property, the material can be modified by plasma.

The support layer 24a, 24b is prepared in a film shape by a general dry method and a wet method. To provide suitable strength of the support layer 24a, 24b, the thickness of the support layer is 50 to 200 μm, and more preferably 100 to 150 μm. The thickness of the support layer 24a, 24b is designed in consideration of the thickness of the polymer electrolyte membrane that is inserted in a subsequent step. If the thickness is less than 50 μm, the support layer cannot sufficiently support the membrane-electrode assembly, and thus cannot provide the function of a gasket.

The elastic layer 26a, 26b is used for enduring stress from pressure during the assembly of the membrane-electrode assemble and polymer electrolyte membrane after sealing the end of the polymer electrolyte membrane 42. The materials of the elastic layer are liquid-type elastic materials. Examples of the liquid-type elastic materials are natural rubber, and synthetic rubbers such as ethylene-propylene-diene monomer (EPDM) rubber, nitrile butadiene (NBR) rubber, silicone rubber, acrylic rubber, and polyurethane, and the preferable elastic material is silicone rubber.

The thickness of the elastic layer 26a, 26b is designed in consideration of a cathode and anode assembled in a subsequent step. Preferably, the thickness is equal to that of the electrode, at 50 to 300 μm. If the thickness of the elastic layer 26a, 26b is excessively thick or thin compared to that of the electrode, the stacked membrane-electrode assembly becomes unfastened and pushed out in a subsequent fuel cell stacking process due to the difference between the thickness of the elastic layer and the electrode.

The multilayered gasket including the adhesive layer 22a, 22b, the support layer 24a, 24b, and the elastic layer 26a, 26b has an opening (A) to interpose the circumferential part of the polymer electrolyte membrane. The opening (A) is formed on the adhesive layer 22a, 22b and support layer 24a, 46b, to the interfacial surface of the support layer 24a, 24b and the elastic layer 26a, 26b.

Figure 3:
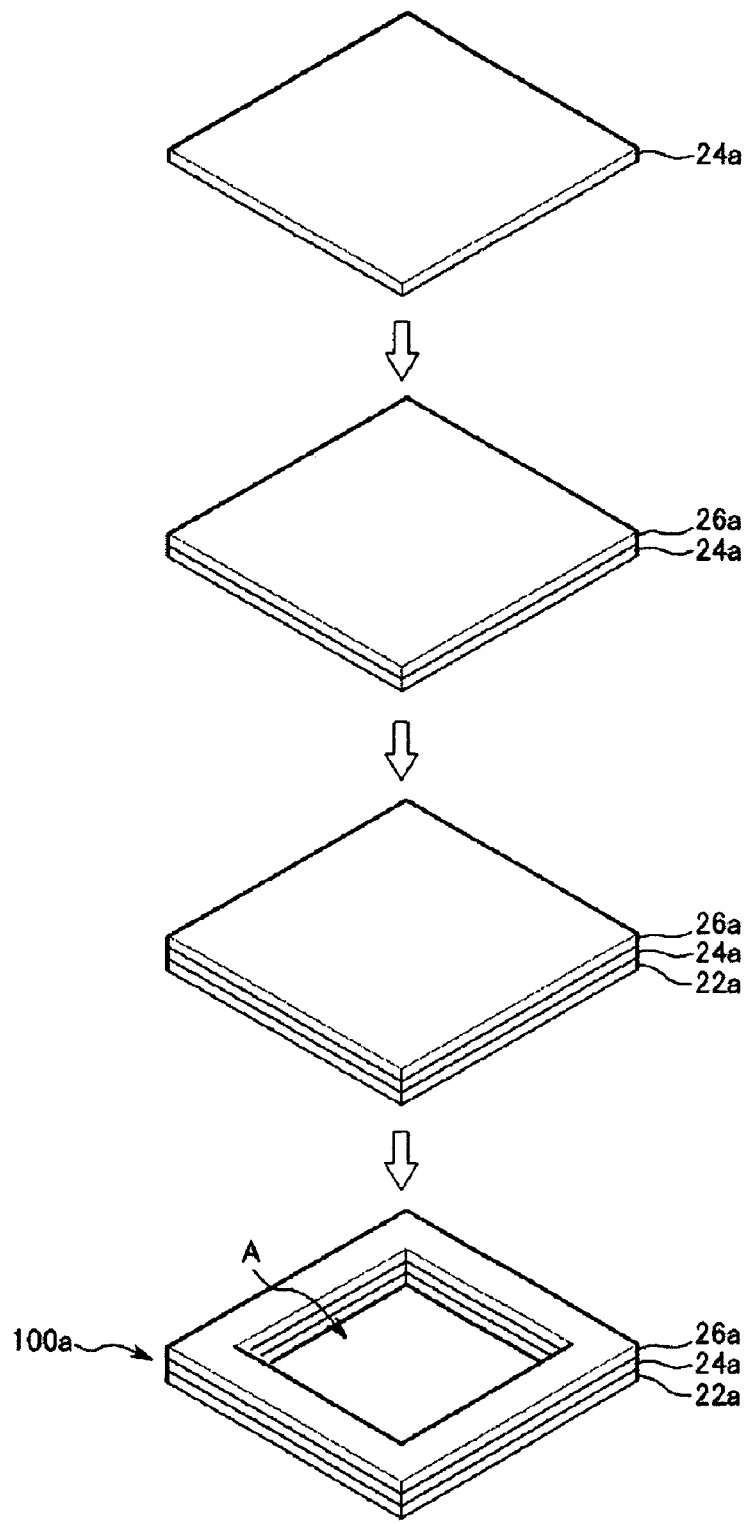
FIG. 3 is a flowchart showing the manufacturing method of the multilayered film gasket equipped with an opening according to the one embodiment of the present invention.

FIG. 3 is a flowchart showing the manufacturing method of the multilayered gasket having an opening.

Referring to FIG. 3, a multilayered film 100a having an opening is prepared by the steps of: a) forming the elastic layer 26a by coating and curing an elastic material on one side of the support layer 24a; b) forming a multilayered film by coating an adhesive agent on the other side of the support layer 24a; and c) forming the opening (A) by punching the inner circle part of the multilayered film.

In the punching process, a protecting film (not shown) is stacked on one side of the adhesive layer 22a to protect it.

The elastic layer 26a is formed by coating, drying, and curing a liquid-type elastic material on one side of the support layer 24a prepared in step a). The conditions of drying and curing can be suitably adjusted depending on the kinds of elastic material used.

In step c), the other side of the support layer 24a where the support layer 24a is not formed is coated with an adhesive agent and dried to form the adhesive layer 22a.

In step d), the inner part of the adhesive layer/support layer/elastic layer 22a/24a/26a multilayer is punched to form the opening (A). Before the punching step, a protecting film is stacked on one side of the adhesive layer 22a, is punched, and is then peeled off before a uniting process.

The protecting film prevents the adhesion of adhesive layers 22a with each other, and facilitates the adhesion and separation of the multilayered films. A protecting film commonly used in the technical field can be used, and examples include polyesters such as polyethyleneterephthalate and polybutyleneterephthalate.

After stacking the membrane-electrode assembly between the multilayered films having openings, the adhesive layer is hardened to produce the gasketed membrane-electrode assembly.

Figure 4:
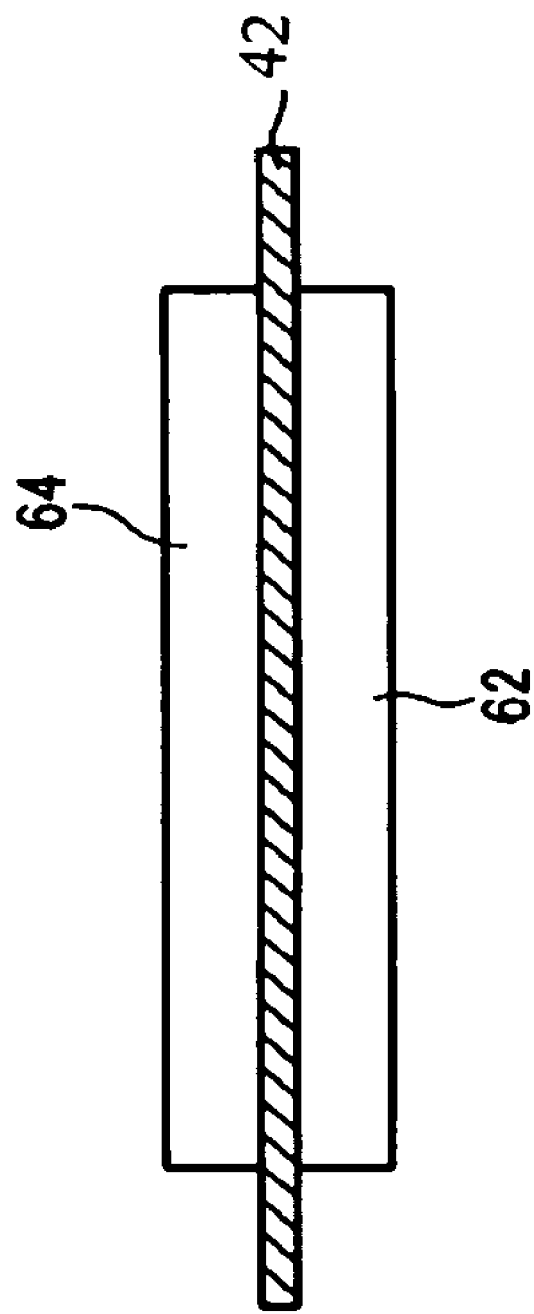
FIG. 4 is a cross-sectional view of the membrane-electrode assembly that comprises a cathode, an anode, and an electrolyte membrane.

FIG. 4 is a cross-sectional view of a membrane-electrode assembly comprising a cathode, an anode, and a polymer electrolyte membrane.

Referring to FIG. 4, the membrane-electrode assembly includes a polymer electrolyte membrane 42 interposed between a cathode 64 and an anode 62. The width of an exposed part of the polymer electrolyte membrane 42 is equal to or smaller than that of the gasket film 100a prepared by a punching process.

The material of the polymer electrolyte membrane 42 of the present invention is one that is generally used in this field without limitation. For example, poly(perfluorosulfonic acid) is used, and Nafion™ sold by Dupont is widely used.

The cathode and anode 62, 64 perform the electrochemical reaction of the fuel cell. The electrodes 60 usually comprise a catalyst layer for accelerating the oxidation and reduction functions of the electrode, and a gas diffusion layer for supporting the catalyst layer and injecting fuel gas and oxidizing gas to the electrodes. All catalysts used for a fuel cell can be used in the present invention, and the examples include a Pt catalyst and a Pt catalyst supported by carbon. The thickness of the electrode depends on the amount of the catalyst.

Figure 5:
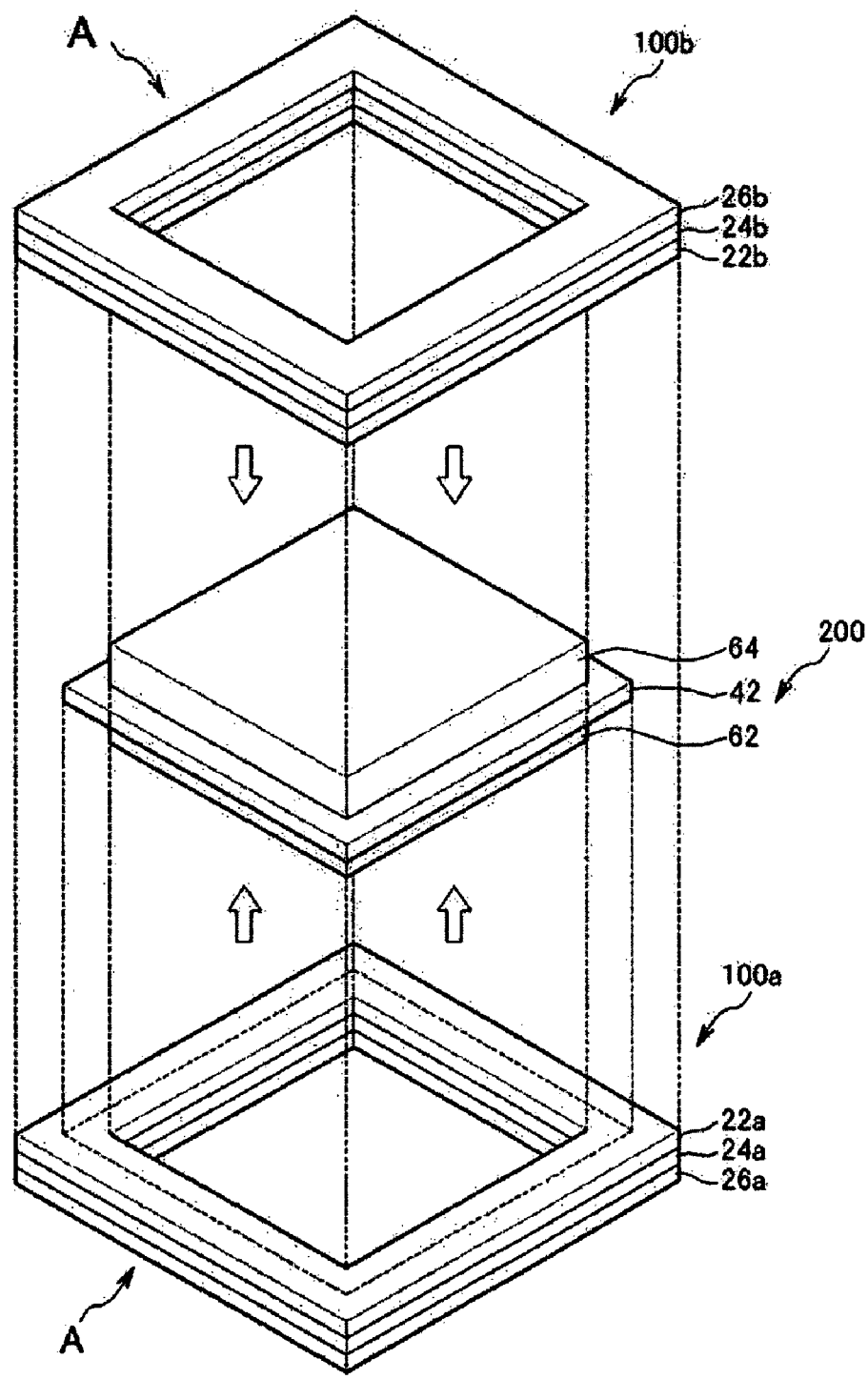
FIG. 5 is a flowchart showing the manufacturing method of the gasketed membrane-electrode assembly according to one embodiment of the present invention.

FIG. 5 is a flowchart showing the manufacturing method of the gasketed membrane-electrode assembly according to the present invention.

Referring to FIG. 5, the method of preparing a gasketed membrane-electrode assembly comprises the steps of: (i) sequentially arranging a pair of multilayered films stacked with an adhesive layer 22a, 22b, a support layer 24a, 24b, and an elastic layer 26a, 26b to face the adhesive layers and each other; (ii) interposing a membrane-electrode assembly 200 between a pair of the multilayered films 100a, 100b; and (iii) curing the adhesive layer 22a, 22b.

The curing process is different depending on the material of the adhesive layer, and is preferably carried out by ultraviolet ray irradiation, X-ray irradiation, or heating.

Through the above process, the multilayer film including adhesive layers, support layers, and elastic layers is formed. The membrane-electrode assembly having a cathode, an anode, and a polymer electrolyte membrane is interposed between a pair of gaskets having openings at their inner parts to face the adhesive layers 22a, 22b, and is then united to obtain a gasketed membrane-electrode assembly.

Preferably, the gasketed membrane-electrode assembly can be used for a fuel cell.

Figure 6:
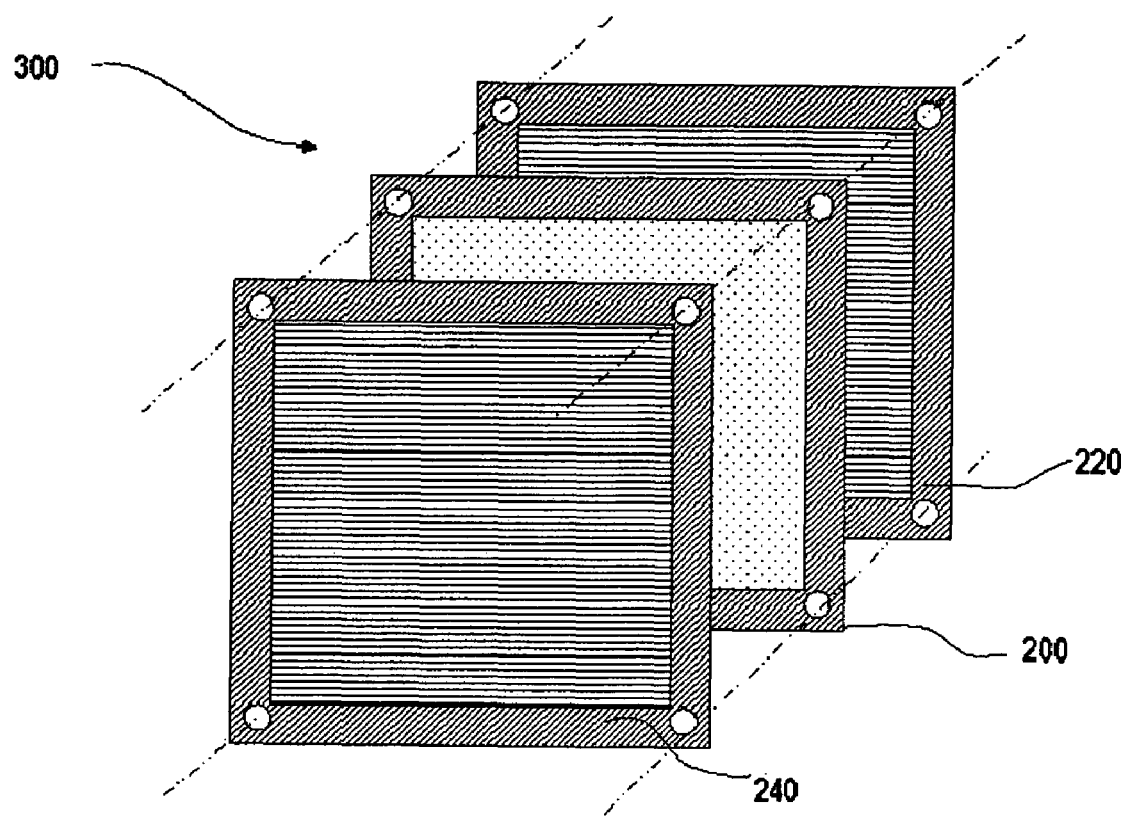
FIG. 6 is a cross-sectional view showing the unit cell of a fuel cell in which separators are arranged on both sides of membrane-electrode assembly.

FIG. 6 is a cross-sectional view showing a unit cell of a fuel cell equipped with the gasketed membrane-electrode assembly according to the present invention.

Referring to FIG. 6, a fuel cell 300 has a structure of a gasketed membrane-electrode assembly 200 interposed between a pair of separators (or bipolar plates 220, 240).

The separator is not shown in FIG. 6, but it forms a flow path with a certain shape to inject the fuel gas and oxidizing gas and to collect electricity.

Substantially, the fuel cell is formed by stacking a plurality of unit cells. The prescribed region of the plurality of stacked gaskets is punched, preferably at the same position to stack the unit cells so that the punched regions are at the same position.

Accordingly, the fuel cell system including the fuel cell stack comprises a stack for a fuel cell which includes the gasketed membrane-electrode assembly and separators located on both side of membrane-electrode assembly, and a gas supplying part to supply fuel gas and oxidizing gas for the stack for a fuel cell.

According to the present invention, the gasket film can be united with the polymer electrolyte membrane, and the leakage of fuel gas and oxidizing gas decreases on operation of fuel cell. In addition, various materials can be selected for each layer of the gasket. Thus, it can be suitable for mass production of a polymer fuel cell due to its simple manufacturing process.

The following examples further illustrate the invention in detail, but are not to be construed to limit the scope thereof.

EXAMPLE 1

Polyesterterephthalate film having a thickness of 100 μm was used as a support layer, and surface-treatment thereof by corona discharge was performed. Then, an elastic layer having a thickness of 200 μm was prepared by coating liquid silicone on the upper side of the support layer with doctor blade coating method, and curing curing it. Subsequently, two multilayered films were made by coating and drying a two-component resin adhesive agent of a polyester-polyurethane polymer by bar coater in an coating amount of 2~3 g/m$^2$.

After forming the protecting film of polyester having a thickness of 50μm on the multilayered film, the opening was formed by punching with a hand press to a somewhat larger rectangular size than that of the electrode. The protecting film was then removed. After arranging the multilayered film having an opening to face the adhesive layers, the prepared membrane-electrode assembly was inserted and then left in an oven at 60° C. for 24 hours to completely harden the adhesive layer. Thus, the membrane-electrode assembly united with gaskets was prepared.

The polymer electrolyte membrane of the membrane-electrode assembly was a NAFION™ membrane (Dupont) prepared by a usual film casting method at a thickness of 150 μm. The anode and cathode electrode were Pt catalysts supported on one side of carbon paper (Pt/C).

Test Example 1

Measurement of Gas Permeability

To test gas permeability of the gasketed membrane-electrode assembly, a test was carried out as follows.

The unit cell of the fuel cell was formed by arranging the gasketed membrane-electrode assembly to contact separators, and was injected with nitrogen gas that had passed through a humidifier to one electrode. The temperature of the cell was 70° C. After the electrode was sufficiently humidified by injecting the nitrogen gas for 1 hour, the gas permeability was measured by pressurizing to a maximum of 4 atm and detecting the gas permeability of the electrode on the other side.

The detection of the nitrogen gas was carried out by connecting a tube to the opposite electrode of the nitrogen-injected electrode, and dipping the tube in a water bath. As a result, air bubbles were not generated during the test, and thus the gasketed membrane-electrode assembly prepared by the present invention can prevent the leakage of fuel gas and oxidizing gas. With the method of unifying the membrane-electrode assembly and gasket according to the present invention, an assembly of an electrolyte membrane and a gasket can be manufactured in large quantities, and various materials of the gasket can be selected.

What is claimed is:

1. A gasketed membrane-electrode assembly comprising:
a membrane-electrode assembly including a cathode, an anode vertically corresponding to the cathode and a polymer electrolyte membrane having a first portion interposed between the cathode and the anode and a second portion surrounding the first portion; and
a gasket including a first multilayer structure having a first adhesive layer, a first support layer and a first elastic layer that are sequentially stacked and a second multilayer structure having a second adhesive layer, a second support layer and a second elastic layer that are sequentially stacked,
wherein the first adhesive layer includes a first part and a second part, and the second adhesive layer includes a third part and a fourth part,
wherein the first part is adhered to one face of the second portion of the polymer electrolyte membrane, and the third part is adhered to the other face of the second portion of the polymer electrolyte membrane such that the second portion of the polymer electrolyte membrane is interposed between the first part of the first adhesive layer and the third part of the second adhesive layer, and
wherein the second part and the fourth part are adhered to each other.

2. The gasketed membrane-electrode assembly according to claim 1, wherein the first and second adhesive layers are prepared from a material selected from the group consisting of silicone resin, epoxy resin, acrylic resin, and a two-component resin prepared by polymerization of polyester-polyurethane.

3. The gasketed membrane-electrode assembly according to claim 1, wherein the first adhesive layer has a thickness of 10 to 200μm and the second adhesive layer has a thickness of 10 to 200 μm.

4. The gasketed membrane-electrode assembly according to claim 1, wherein the first and second support layers are prepared from a material selected from the group consisting of polyesters; polyamides; polystyrenes; and polyolefins selected from the group consisting of polyethylene and polypropylene, and a copolymer thereof.

5. The gasketed membrane-electrode assembly according to claim 1, wherein the first support layer has a thickness of 50 to 200 μm and the second support layer has a thickness of 50 to 200 μm.

6. The gasketed membrane-electrode assembly according to claim 1, wherein the first and second elastic layers are prepared from a material selected from the group consisting of natural rubber, ethylene-propylene-diene monomer (EPDM) rubber, nitrile butadiene (NBR) rubber, silicone rubber, acrylic rubber, and polyurethane.

7. The gasketed membrane-electrode assembly according to claim 1, wherein the first elastic layer has a thickness of 50 to 300 μm and the second elastic layer has a thickness of 50 to 300 μm.

8. A method of preparing a gasketed membrane-electrode assembly comprising the steps of:
preparing a membrane-electrode assembly including a cathode, an anode vertically corresponding to the cathode and a polymer electrolyte membrane having a first portion interposed between the cathode and the anode and a second portion surrounding the first portion;
preparing a first multilayer structure having a first adhesive layer, a first support layer and a first elastic layer that are sequentially stacked and a second multilayer structure having a second adhesive layer, a second support layer and a second elastic layer that are sequentially stacked;
wherein the first adhesive layer includes a first part and a second part, and the second adhesive layer includes a third part and a fourth part,
adhering the first part to one face of the second portion of the polymer electrolyte membrane, and the third part to the other face of the second portion of the polymer electrolyte membrane such that the second portion of the polymer electrolyte membrane is interposed between the first part of the first adhesive layer and the third part of the second adhesive layer, and
adhering the second part of the first adhesive layer and the fourth part of the second adhesive layer to each other.

9. A fuel cell comprising a gasketed membrane-electrode assembly according to claim 1 interposed between a pair of separators.

* * * * *